Dec. 6, 1966     E. T. O'NEILL     3,289,463
PIEZOELECTRIC CRYSTAL EVALUATOR

Filed May 4, 1965     2 Sheets-Sheet 1

INVENTOR.
EDWARD T. O'NEILL
BY Philip Schneider
Louis B. Applebaum
ATTORNEYS 3,289,463
PIEZOELECTRIC CRYSTAL EVALUATOR
Edward T. O'Neill, Rye, N.Y., assignor to the United States of America as represented by the Secretary of the Navy
Filed May 4, 1965, Ser. No. 456,033
2 Claims. (Cl. 73—37)

This application is a continuation-in-part of application Serial No. 270,774, filed April 4, 1963 now abandoned.

This invention relates to apparatus for evaluating the merit of piezoelectric crystals especially with respect to their sensitivity characteristics.

Piezoelectric crystals are used as pressure-electricity transducers in many applications; for example, they are used in hydrophones. Usually, testing of the sensitivity characteristic of a crystal is done after the crystal has been been incorporated in the hydrophone, or after the crystal has been plasticized in a simulated hydrophone. In the latter case, the test unit crystal must be discarded after the test is finished.

The present device permits the testing of crystals before their incorporation in the devices of which they form component parts and does not interfere with subsequent use of the tested crystals.

The present invention comprises a container having inner and outer walls. The inner wall is flexible and encloses a hollow space in which a piezoelectric crystal can be inserted. The space between the inner and outer walls is airtight and can be pressurized. When this space is pressurized, the crystal is gripped by the flexible inner wall and pressure is applied to the crystal thereby. The quality of the crystal is shown by its response to a sudden release of pressure.

An object of this invention is to evaluate the merit of piezoelectric crystals.

Another object is to evaluate the merit of piezoelectric crystals before their incorporation into the devices of which the form component parts.

A further object is to permit evaluation of piezoelectric crystals rapidly, easily, inexpensively and without sacrifice of the tested units.

Figure 1:
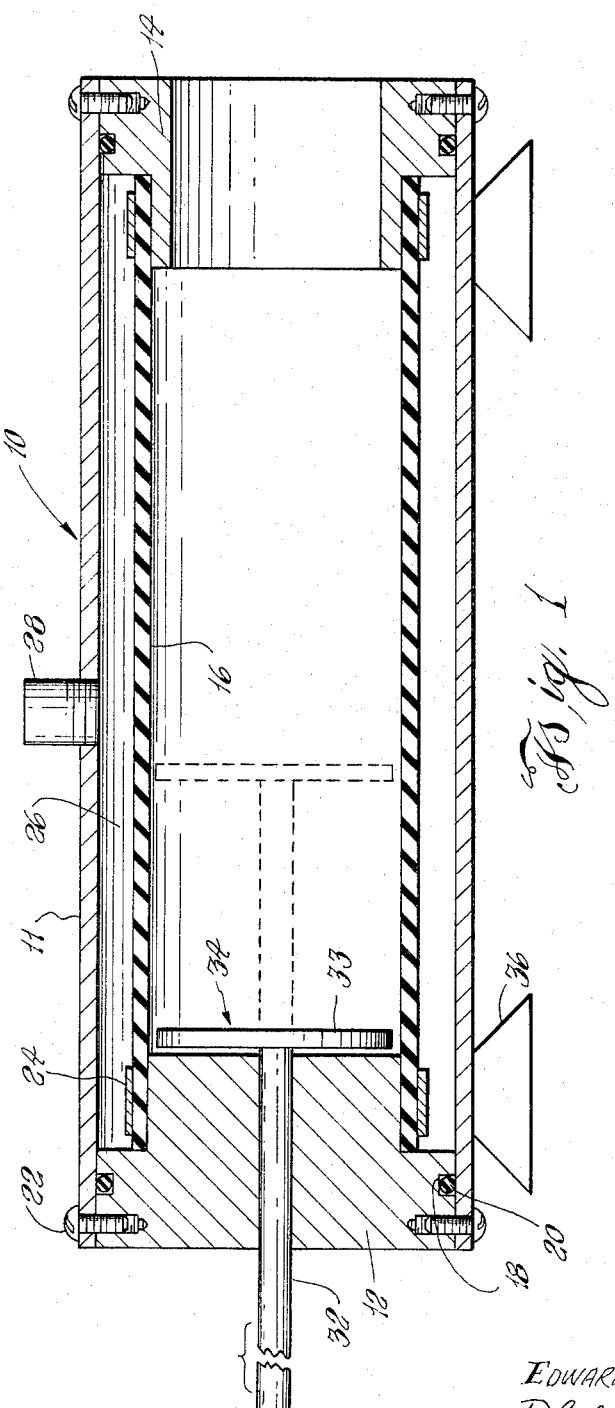
Figure 2:
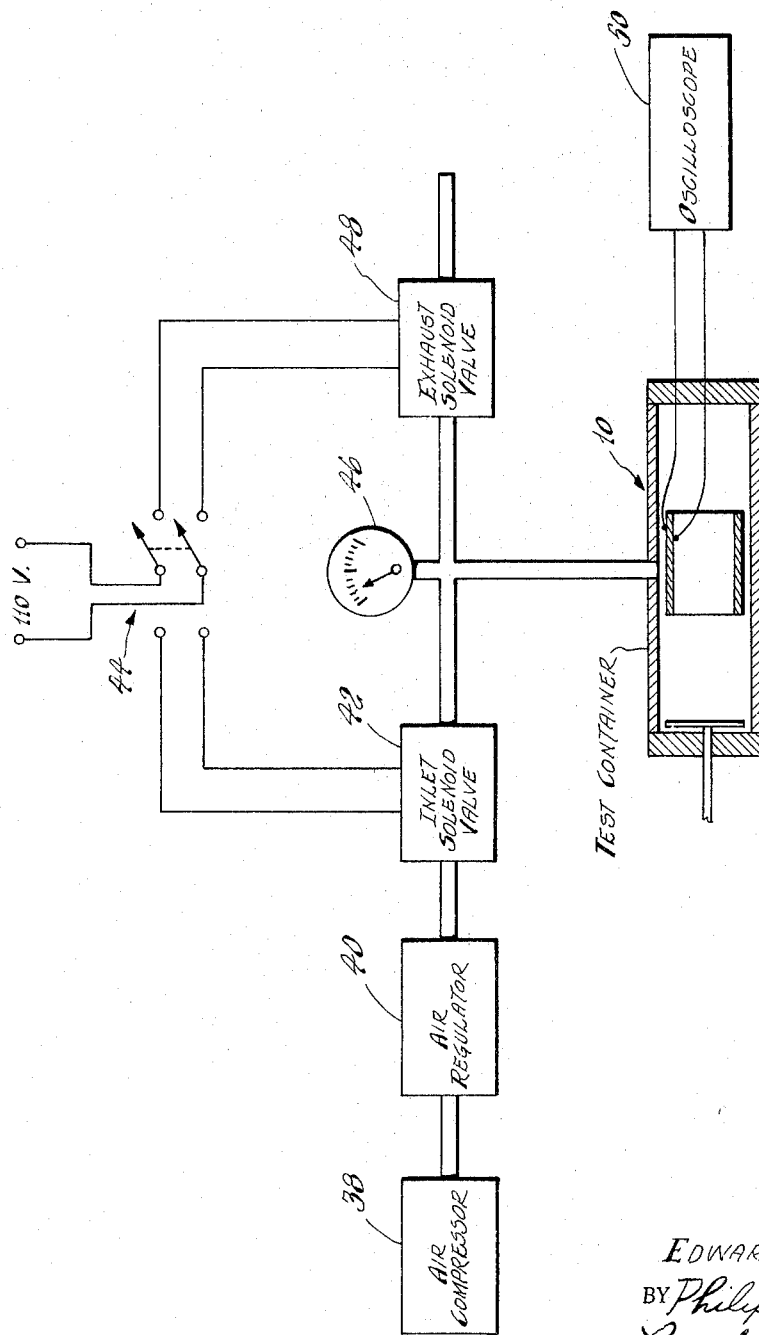

Other objects and many of the attendant advantages of this invention will be readily appreciated as the same becomes better understood by reference to the following detailed description when considered in connection with the accompanying drawings wherein:

FIG. 1 is a longitudinal cross-sectional view of an embodiment of the invention; and FIG. 2 is a schematic diagram illustrating the auxiliary equipment which is employed, and a typical arrangement of such equipment, for testing crystals.

An embodiment of the present invention is shown in cross-section in FIG. 1. A test container 10 comprises an outer wall 11, preferably cylindrical in shape, an end plug 12 at one end of the outer wall, a ring insert 14 at the other end of the outer wall, and an inner wall 16. The material from which the outer wall, the end plug and the ring insert are fabricated can be any rigid material capable of withstanding at least 15 lbs. per square inch of fluid pressure, such as aluminum.. The inner wall 16 is a piece of flexible material, such as neoprene rubber, preferably cylindrical in shape.

The end plug 12 is formed in two sections; the smaller section, which may be termed the recessed section, has an outer diameter which is smaller than the inner diameter of the outer wall 11; the larger section, which may be termed the flange section, has an outer diameter which is very slightly smaller than the inner diameter of the outer wall 11 so that the end plug 12 can slide into the cylinder formed by the outer wall 11. The flange section of the end plug 12 is encircled by a recess 18 in which a circular O-ring 20 of rubber is located, so that when the end plug 12 is secured to the outer wall 11 by suitable means, such as the screws 22 shown, the contact between the outer wall 11 and the end plug 12 is fluidtight.

The ring insert 14 has the same basic form as the end plug 12, and its flange and recessed sections have substantially the same outer diameters as the flange and recessed sections of the end plug 12. The flange section is also encircled by a recess containing a circular O-ring which makes contact between the ring insert and the outer wall 11 airtight when the ring insert 14 is secured in place by suitable means such as the screws which are shown.

The inner wall 16 of the container comprises a cylinder which fits over the recessed sections of the end plug 12 at one end and the ring insert 14 at the other end. Fluidtight contact is made with the recessed sections by suitable means such as metal clamps 24 which encircle both the flexible cylinder 16 and the recessed section. Thus, a fluidtight chamber 26 is formed between the inner and outer wall of the container, except for a pipe fitting 28 through which connection to an air-supply line can be effected.

The end plug 12 is formed with a narrow bore 30 through which the shaft 32 of a plunger 34 extends. The ring insert 14 is formed with a wide bore sufficient in diameter to admit the piezoelectric crystals to be tested into the container. The container rests in a horizontal position on a pair of supports 36.

A piezoelectric crystal (cylindrical in shape) is inserted inside the inner wall 16 of the container when it is about to be tested. It is centrally positioned by means of the piston member 33 of the plunger 34.

The auxiliary equipment with which the device is used is shown in FIG. 2. Pressurized air is supplied by means such as an air compressor unit 38 through an air regulator 40 and inlet valve 42 to the airtight chamber 26 of the test container. Air is allowed to pass through the inlet valve, which is normally closed, by throwing the power switch 44 to the left (in the figure) and thereby applying electrical energy to a solenoid which opens the inlet valve 42. The pressure of the air is adjusted by means of the air regulator 40 to a pressure of about 15 lbs. per square inch above atmospheric pressure, as indicated by any suitable air-pressure gauge 46 and then the power switch 44 is thrown to its off position (center position in the figure) thereby closing the inlet valve 42.

The pressure in the fluidtight chamber 26 of the test container causes the flexible inner wall 16 to bow inward thereby gripping the piezoelectric crystal and applying pressure to it. This pressure is suddenly released by throwing the power switch 44 to the right, thereby opening the normally closed exhaust solenoid valve 48. As a numerical example, the 15 lbs. of pressure is released in approximately ⅕ of a second, although this time interval is by no means critical.

The electrodes on the piezoelectric crystal are connected electrically to a suitable indicating device, such as an oscilloscope, so that an indication of the voltage output of the crystal is obtained when the air pressure is suddenly released. Comparison of the output voltage with that obtained from a standard crystal indicates the relative merit of the crystal under test.

Obviously many modifications and variations of the present invention are possible in the light of the above teachings. It is therefore to be understood that within the scope of the appended claims the invention may be practiced otherwise than specifically described.

I claim:
1. In combination with means for supplying pressur- ized fluid thereto and quickly releasing it therefrom, a test container comprising in combination:

a fluidtight chamber having inner and outer walls,
said inner wall being fabricated from a flexible material and encircling a space in which an object can be placed;
means for connecting said chamber to said source of supply of pressurized fluid;
said test container including an end plug which seals said inner and outer walls at one end and plunger means having a shaft and a piston member,
said end plug being formed with a bore through which said plunger shaft extends so that said plunger can be manipulated to position an object placed within the space encircled by said inner wall.

2. Apparatus for testing piezoelectric transducers comprising, in combination:

a test container comprising
a fluidtight chamber having inner and outer walls,
said inner wall being fabricated from a flexible material and encircling a space in which a transducer can be placed;
an end plug which seals said inner and outer walls at one end and plunger means having a shaft and a piston member, said end plug being formed with a bore through which said plunger shaft extends so that said plunger can be manipulated to position a transducer placed within the space encircled by said inner wall;
means coupled to said test container for introducing a fluid under pressure into said fluidtight chamber; and
means for suddenly releasing the pressure in said fluidtight chamber.

References Cited by the Examiner

UNITED STATES PATENTS

| | | | |
|---|---|---|---|
| 2,574,475 | 11/1951 | Grogan | 73—4 |
| 2,802,982 | 8/1957 | Sussman | 324—56 |
| 3,143,111 | 8/1964 | Green | 128—213 |

LOUIS R. PRINCE, *Primary Examiner.*

ISAAC LISANN, *Examiner.*

DONN MCGIEHAN, *Assistant Examiner.*